Nov. 14, 1961 J. H. KUCK 3,008,666
TEMPERATURE SONDE
Filed April 14, 1952 2 Sheets-Sheet 1
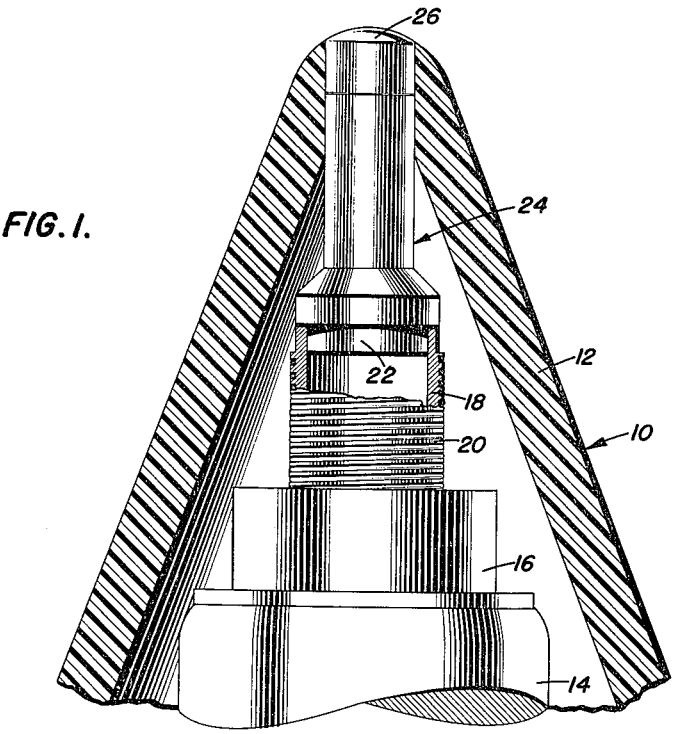
FIG. I.
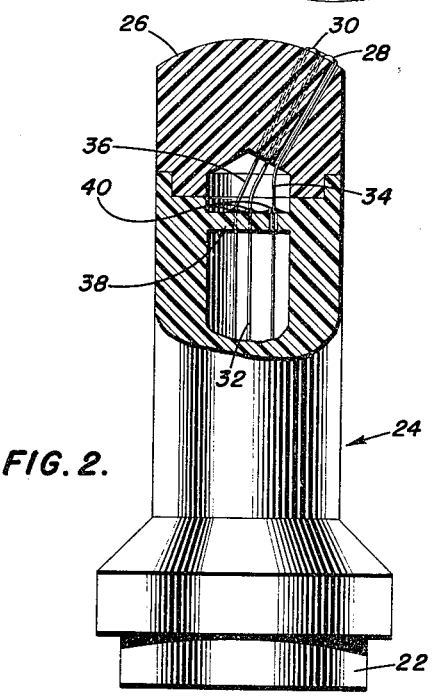
FIG. 2.
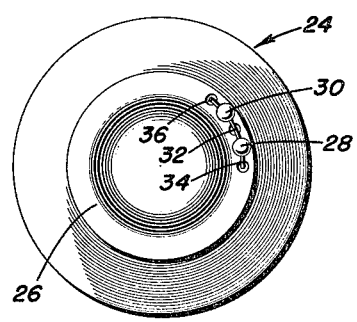
FIG. 3.
INVENTOR.
JOHN H. KUCK
BY
ATTORNEYS

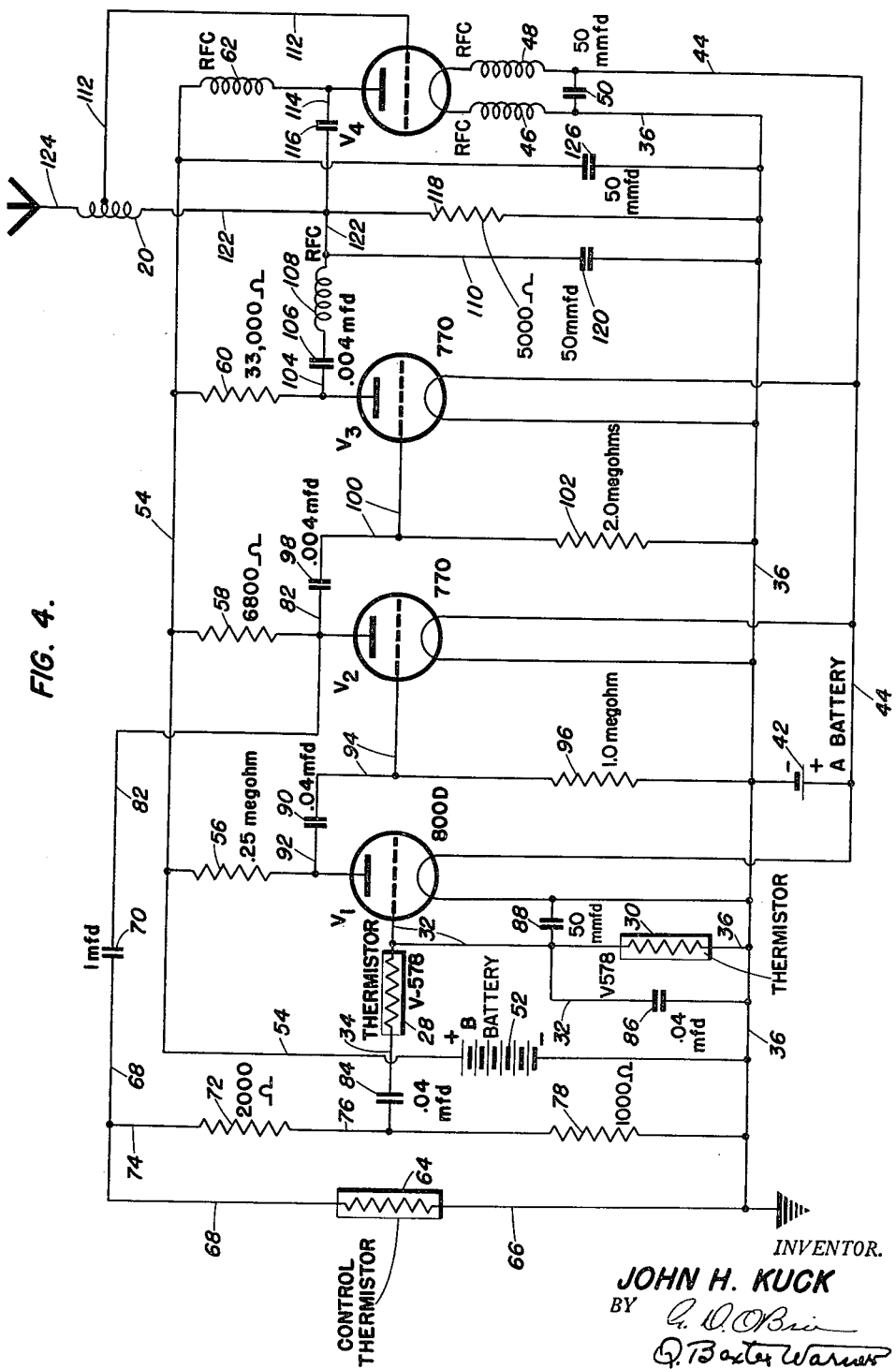

United States Patent Office 3,008,666
Patented Nov. 14, 1961

3,008,666
TEMPERATURE SONDE
John H. Kuck, Silver Spring, Md., assignor to the United States of America as represented by the Secretary of the Navy
Filed Apr. 14, 1952, Ser. No. 282,147
5 Claims. (Cl. 244—14)

The present invention relates generally to temperature measuring device, and more particularly to apparatus for measuring the temperature of an inaccessible moving object, such as a projectile in flight.

In the research and development of proximity fuzes for use with artillery projectiles, it was found that sometimes premature actuation of the fuze occurred. It was thought possible that such prematures were caused by unduly high temperatures produced in the fuze by air friction during flight of the projectile, often at speeds in the vicinity of three times the normal speed of sound in air. Such high temperatures could seriously damage the fuze, for example, by causing the melting apart of soldered joints, the desruction of insulation or potting compounds, and other undesirable effects, thus making it highly desirable to provide some arrangement for measuring the temperatures actually produced.

The present invention, therefore, has for its principal object to provide a system for determining the temperatures at any desired locations on proximity fuzes and similar devices, while such devices are in flight and therefore inaccessible.

Another object of the invention is to provide an electrical apparatus that may be carried by the device whose temperature is to be determined, said apparatus including a temperature-responsive electrical resistor and a frequency-modulated radio transmitter controlled thereby, whereby temperature indicating signals may be emitted from the device and received and interpreted at a suitable receiving station.

A further object of the invention is to provide a thermistor arrangement and a circuit for audio frequency modulation that has a resistive change with heat variation which can be mounted in the nose cap of a projectile or the like for measuring the temperature thereof during actual flight conditions.

Other objects and many of the attendant advantages of this invention will be readily appreciated as the same becomes better understood by reference to the following detailed description when considered in connection with the accompanying drawings wherein:

FIG. 1 is a fragmentary diagrammatic axial enlarged section of a proximity fuze embodying the invention, parts not necessary to an understanding of the present invention being omitted;

FIG. 2 shows, on a still larger scale, an elevation, partly in axial section, of a thermistor support, forming part of the invention;

FIG. 3 is a corresponding plan of the arrangement shown in FIG. 2 showing the thermistor head; and FIG. 4 is a circuit diagram.

In accordance with the invention, electrical apparatus is provided for generating a signal at a frequency which is a function of temperature at a given point along a proximity fuze or a missile. The apparatus includes a plurality of high negative temperature type resistors (thermistors) which, in the embodiment shown in FIGS. 1, 2, and 3, are placed in the nose cap of the fuze or missile, and an electrical circuit, including these resistors, for audio frequency modulation. It should of course be understood that the resistors when placed in the nose cap will respond to temperature conditions in the area of the projectile nose only and that if temperature indications are wanted at another point on the projectile, say near the base, said resistors would have to be placed at or near said other point. The circuit also includes an audio frequency oscillator, the frequency of which is a function of the resistances of the resistors. A control resistor (thermistor) is located in the audio frequency oscillator circuit to prevent over-excitation of the audio frequency oscillator. A radio frequency oscillator is also provided in the circuit.

Referring now to FIGS. 1, 2 and 3 of the drawings, there is shown a proximity fuze 10 comprising a nose 12 made of suitable insulating material, and containing a metallic shield can 14 housing the electronic components. Shield can 14 has mounted thereon a case 16 and a coil form 18, carrying an inductance 20.

The coil form 18 is tubular and in its outer end is mounted the inner reduced end 22 of the thermistor support 24. This support 24 is a tubular column or post made of suitable insulating material, for example polyethylene. At its tip it carries a button 26 which may be made of ethylcellulose or other insulating material having sufficient resistance to injury by heat. The button 26 is so mounted that its outer surface forms a continuation of the outer surface of the nose 12 of fuze 10 and, in fact, constitutes the tip thereof.

Two tiny resistors 28 and 30 are carried by button 26, and are located near its outer edge. These resistors 28 and 30 are of the type known as thermistors, and have several somewhat unusual characteristics; namely, they have extremely high negative temperature coefficients, and are smaller than ordinary pin heads. This smallness has two vital advantages, first the temperature to be indicated may be localized sharply, and second the small size permits very rapid heat transfer, so that the thermistors acquire the ambient temperatures almost instantaneously.

The two thermistors 28 and 30 have one lead 32 in common, and two individual leads 34 and 36, the last-named lead 36 being grounded to the body of the fuze. As the thermistors are tiny and fragile, it is necessary to support these leads 32, 34 and 36 independently of the thermistors 28 and 30 so that the very high inertial forces produced on firing the fuzed projectile from a gun will not destroy the connections. This is accomplished in a simple manner by providing within the post 24, a shelf or platform 38, through which the thermistor leads 32, 34 and 36 pass. Just above this platform 38, a small drop of solder 40 is applied to each lead 32, 34 and 36, to take the pull of these leads below platform 38 and thus protect the upper portions leading to the thermistors 28 and 30 from derangement and possible destruction by the setback forces.

Referring now to FIG. 4, there is illustrated one possible circuit that may be used, for translating temperature variations into frequency variations. Starting at the grounded conductor 36 which forms the negative terminal of the A-battery 42, whose positive terminal is conductor 44, it will be noted that the filamentary cathodes of triodes $V_1$, $V_2$, $V_3$ and $V_4$ are energized from battery 42 in the usual way, radio frequency choke coils 46 and 48 being interposed in the filament leads of $V_4$, with a suitable radio frequency by-pass capacitor 50 across the filament leads 36 and 44 of $V_4$ as shown.

Anode energization of the triodes $V_1$, $V_2$, $V_3$ and $V_4$ is furnished by the B-battery 52 through the +B lead 54, the negative side of battery 52 being grounded to conductor 36. The anodes $V_1$, $V_2$ and $V_3$ are connected to lead 54 through resistors 56, 58 and 60 respectively, while the anode $V_4$ is connected to lead 54 through a radio frequency choke coil 62.

A control termistor 64 is connected at one end by lead 66 to ground lead 36 and at its other end through lead 68 to one side of capacitor 70 and one terminal of resistor 72 by lead 74. The remaining terminal of resistor 72 is connected through conductor 76 to one terminal of resistor 78, whose remaining terminal is connected to ground lead 36. The remaining terminal of capacitor 70 is connected by conductor 82 to the anode of $V_2$. Conductor 76 leads also to one side of capacitor 84, whose other side is connected to one terminal of the thermistor 28, and thence through conductor 32 to the grid of $V_1$. A capacitor 86 is connected in parallel with the thermistor 30 by conductor 32 and the grounded side of the filament of triode $V_1$. Although capacitors 86 and 88 apparently are in parallel, there is a difference in effect, as 86 would be, ordinarily, a paper dielectric capacitor with long leads while capacitor 88 is a high quality low loss component close to the triode $V_1$, whose purpose is to provide a radio frequency by-pass.

In other words, it is desired to insure that negligible RF voltage due to stray pickup be applied between grid and filament of $V_1$ since such RF voltage may alter the gain and affect the input impedance of this tube. Since the .04 mfd. is a paper condenser having long leads, it may have sufficient inductance at radio frequency to prevent it from being a sufficiently low impedance. Therefore, the 50 mmfd. small ceramic condenser is connected with short leads close to the points which it is desired to bypass.

Capacitive coupling is provided between triodes $V_1$ and $V_2$ by the capacitor 90 one side of which is connected to the anode of $V_1$ by conductor 92 while the other side is connected to the grid of $V_2$ by conductor 94, a 1 megohm resistor 96 being connected between the grid of triode $V_2$ and ground lead 36 as shown. Triode $V_2$, in turn, is capacitatively coupled to $V_3$ by conductor 82, capacitor 98 and conductor 100, which connect the anode of $V_2$ to the grid of $V_3$, with the grid of $V_3$ being connected to the ground 36 through the 2 megohm resistor 102.

Triode $V_3$ is coupled to the final tube $V_4$ through conductor 104 connected to the anode of $V_3$ and leading to one side of capacitor 106 whose other side is connected through radio frequency choke coil 108, conductor 110, part of inductance 20 and conductor 112 to the grid of $V_4$. The anode of $V_4$ is coupled through conductor 114 and capacitor 116 back to conductor 110. Resistor 118 and capacitor 120, in parallel, are connected between conductor 122 and ground lead 36. Capacitors 116 and 120 provide a RF bypass for the tank circuit current to flow from the plate of tube $V_4$ to bottom of the tank coil 108 and ground. The ultimate output terminal (which is the antenna cap for broadcasting back to earth) 124 is connected to the free end of the inductance 20. A radio frequency by-pass capacitor 126 is connected between conductor 54 and ground lead 36 as shown.

The operation of the invention will now be explained. The temperature response of the circuit is due to the characteristics of the thermistors 28 and 30, which are circuit elements in the nature of resistors, made of a mixture of metallic oxides or other semi-conductors enclosed in tiny glass beads about .03" diameter, suspended on fine platinum leads. The resistance of a thermistor may decrease to as little as one-tenth its original value, for a temperature rise of 100° F.

The circuit comprises an audio frequency oscillator, the frequency of which depends on the resistances of the thermistors, and a buffer stage and a radio frequency oscillator. The circuit with the component values as indicated in FIG. 4, wherein low resistance thermistors are disclosed, has a useful temperature indicating range of 100° F. to 400° F. However, when low resistance thermistors are replaced by high resistance thermistors, a somewhat more extended range is secured, from 75° F. to 450° F. When a low resistance thermistor is used, all values are as noted on FIG. 4, but when a high resistance type thermistor is substituted, resistors 72 and 78 are changed to 4000 ohms and 2500 ohms respectively, and the capacitor 84 and 86 are changed to .004 mfd., all other components of the circuit remaining the same.

The audio oscillator, when the low resistance thermistors are used, is designed to oscillate at frequencies from 200 to 5000 cycles per second for a change of thermistor resistance $R_t$, from 50,000 ohms to 500 ohms, which corresponds to the temperature range 100° F. to 400° F. This circuit goes out of oscillation from $R_t$ falls below 200 ohms. Substitution of the high resistance type changes the frequency range to 100 to 10,000 cycles per second, with the temperature range of 75° F. to 450° F., and this circuit goes out of oscillation at 30,000 cycles, when $R_t$ is 400 ohms.

The frequency of oscillation is:

$$f = \frac{1}{2\pi R_t C}$$

where C is the capacitance of each of capacitors 84 and 86, which are equal to each other, and $R_t$ is the resistance of each of the thermistors 28 and 30 at the existing temperature.

However, the oscillator goes out of oscillation when the frequency becomes too low, due to energy losses in the coupling capacitors in the feedback loop, and, therefore, any attempt to lower the overall frequency range will raise the low temperature limit of the circuit.

The purpose of the control thermistor 64 is to provide some AVC action in order to prevent over-excitation of the audio oscillator tube in any part of its frequency range. This replaces the non-linear negative feedback in the usual Wien bridge oscillator. Over-excitation may cause the frequency determining network, including the capacitors 84 and 86, and the thermistors 28 and 30, to lose control. The frequency then behaves erratically or drops to a low value, and the wave shape becomes non-sinusoidal. When in this condition, the oscillator is believed to operate like a multivibrator, the time constants in the interstage coupling R—C's being the main factors in controlling the frequency. In the high resistance circuit, the frequency drops to about 12 cycles per second, and the wave shape is very irregular. In the low resistance circuit, the wave shape is more regular and the frequency is about 600 cycles per second throughout the resistance range of thermistors 28 and 30.

If the thermistor 28 breaks, the circuit goes out of oscillation. If the thermistor 30 breaks, the circuit continues to oscillate, but at a frequency lower than normal. As the resistance of the remaining thermistor 28 is decreased, the frequency of the circuit may rise a little above that of the normal circuit at ambient temperature, but the rise is not comparable to the frequency rise of the normal circuit under the same conditions. The wave shape is poor and the amplitude greater than normal. Raising the frequency of the circuit by changing the value C of the capacitors 84 and 86, does not result in a more definite frequency change to indicate when the thermistor 30 breaks. The frequency at high temperatures still rises slightly above that of the normal circuit at ambient temperature.

The possibility of using one thermistor instead of two was considered. The resulting high resistance circuit oscillates only over a very narrow range. The low resistance circuit will oscillate with either thermistor 28 or 30 replaced by a fixed resistor, and a fixed resistance could be chosen such that the circuit would oscillate over the whole temperature range, but as the variable resistance of the remaining thermistor becomes much greater (or smaller) than the fixed resistance the voltage stability and reliability of the circuit tend to decrease.

For quantity production it has been found desirable to match the capacitors 84 and 86 to be as nearly equal as possible, and likewise to match the thermistors 28 and 30 to equality. If these thermistors are equal, the impedance of the frequency selective network will always equal 2.12 times the resistance of either thermistor at the oscillation frequency. Selection of the triodes for certain ranges of amplification factor and of transconductance for the best results is also advisable.

The radio frequency oscillator, based on triode $V_4$, is grid-modulated in accordance with the audio frequency output from $V_3$.

The modulated output signal may be received by an AM or FM receiver, as set up in any given case, the audio frequency signal being recorded in either event. The record is then played back in the laboratory to measure the frequencies, which are then translated into temperatures, preferably by means of previously prepared calibration curves. For a reference standard, a thousand cycle note from a standard oscillator may be recorded at the beginning and end of each record, in order to check the turntable speed of the recorder and the playback, whereupon any discrepancies in speed may be allowed for and the record corrected correspondingly, to yield the desired temperatures. Usually such correction is relatively small, say less than 4% error in frequency or 3° F. in temperature.

It will be evident that the present instrument may be used to measure temperature at any point on a projectile, while the latter is in flight. This information is of interest because temperatures high enough to melt a solder joint on external antenna connections may be reached and many failures of the proximity fuze may be traced to such cause. In addition, the surface of the ethyl cellulose nose of the fuze may become pitted and/or softened by excessive temperatures.

While certain numerical values of the components have been given in the specification, it is to be understood that such values have been supplied in a suggestive sense, and not as limitations, and suitable values may be provided for any reasonable set of conditions to be met in any actual case.

Obviously many modifications and variations of the present invention are possible in the light of the above teachings. It is therefore to be understood that within the scope of the appended claims the invention may be practiced otherwise than as specifically described.

What is claimed is:

1. In a telemetering system for an aerial missile that is subjected to very high inertial forces produced on firing, temperature variation responsive means carried by said missile on an exposed surface thereof for acquiring ambient temperature variations due to air friction on said surface of said missile as it travels along a trajectory, and means associated with said temperature variation responsive means for generating a signal which is a function of said temperature variations, said means including a temperature-change controlled modulator with an audio frequency oscillator, the frequency output of said audio frequency oscillator being a function of said temperature variations, and an automatic volume control circuit including a control resistor of a high negative coefficient type connected between ground and the output terminal of said audio frequency oscillator to prevent over-excitation of said audio frequency oscillator, whereby the frequency stability of said audio frequency oscillator will be materially improved.

2. In a telemetering system for an aerial missile that is subjected to very high inertial forces produced on firing, a nose cap, resistor means carried in the nose cap of said missile, said resistor means being responsive to ambient temperature variations at given points along said cap, and means associated with said resistor means for generating a signal which is a function of said temperature variations, said means including a temperature-change controlled modulator having an audio frequency oscillator, and an automatic volume control circuit including a control resistor of high negative temperature coefficient type connected between ground and the output of said audio frequency oscillator to prevent over-excitation of said audio frequency oscillator, whereby the frequency stability of said audio frequency oscillator will be improved.

3. In a telemetering system for an aerial missile that is subjected to very high inertial forces produced on firing, a plurality of resistors carried by said missile, said resistors being of a high negative temperature coefficient type, and a circuit for audio frequency modulation, said circuit including said resistors, an audio frequency oscillator, the frequency of which depends upon the resistances of said resistors, an automatic volume control circuit including a control resistor of high negative temperature coefficient type connected between ground and the output of said audio frequency oscillator to prevent over-excitation of said audio frequency oscillator, whereby the frequency stability of said audio frequency oscillator will be improved, at least one amplifier, and a radia frequency oscillator for emitting the output signal of the audio frequency oscillator.

4. In a telemetering system for an aerial missile that is subjected to very high inertial forces produced on firing, a nose cap, a plurality of resistors carried in an exposed position on the nose cap of said missile, said resistors being of the high negative temperature coefficient type, a circuit including said resistors, an audio frequency oscillator the frequency of which depends upon the values of said resistors, an amplifier for said audio frequency oscillator output signal, a radio frequency oscillator, and a control resistor also of the high negative coefficient type connected between ground and the output of said audio frequency oscillator to prevent over-excitation thereof.

5. In combination with an aerial missile that is subjected to very high inertial forces produced on firing, an electrical apparatus for generating a signal at a frequency which is a function of temperature at a given point along said missile, said apparatus comprising a plurality of high negative temperature type resistors carried at said given point on said missile, and a circuit including said resistors, for frequency modulation, said circuit also including an audio frequency oscillator, the frequency of which depends upon the values of said resistors, a control resistor in said audio frequency oscillator circuit and connected between ground and the output of said audio frequency oscillator to prevent over-excitation of said audio frequency oscillator, an amplifying stage, and a radio frequency oscillator for emitting the modulated signal from said audio frequency oscillator.

References Cited in the file of this patent

UNITED STATES PATENTS

| | | |
|---|---|---|
| 2,110,552 | Hayden | Mar. 8, 1938 |
| 2,210,903 | Dunmore | Aug. 13, 1940 |
| 2,323,317 | Dunmore et al. | July 6, 1943 |
| 2,517,133 | Porter | Aug. 1, 1950 |
| 2,591,600 | Pear | Apr. 1, 1952 |